(12) United States Patent
Li

(10) Patent No.: US 10,379,287 B2
(45) Date of Patent: Aug. 13, 2019

(54) BACKLIGHT MODULE AND LIQUID CRYSTAL DISPLAY DEVICE

(71) Applicant: SHENZHEN CHINA STAR OPTOELECTRONICS TECHNOLOGY CO., LTD., Shenzhen, Guangdong (CN)

(72) Inventor: Quan Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 224 days.

(21) Appl. No.: 15/120,500

(22) PCT Filed: Apr. 22, 2016

(86) PCT No.: PCT/CN2016/080037
§ 371 (c)(1),
(2) Date: Aug. 19, 2016

(87) PCT Pub. No.: WO2017/166345
PCT Pub. Date: Oct. 5, 2017

(65) Prior Publication Data
US 2018/0149806 A1 May 31, 2018

(30) Foreign Application Priority Data
Apr. 1, 2016 (CN) .......................... 2016 1 0202095

(51) Int. Cl.
F21V 8/00 (2006.01)
G02F 1/1333 (2006.01)
G02F 1/1335 (2006.01)

(52) U.S. Cl.
CPC ......... *G02B 6/0088* (2013.01); *G02B 6/0023* (2013.01); *G02B 6/0085* (2013.01);
(Continued)

(58) Field of Classification Search
CPC .. G02B 6/0088; G02B 6/0023; G02B 6/0085; G02B 6/0055; G02F 1/133615;
(Continued)

(56) References Cited

U.S. PATENT DOCUMENTS 9,645,297 B2 5/2017 Li
9,658,381 B2 5/2017 Fan
(Continued)

FOREIGN PATENT DOCUMENTS

CN 103499054 A 1/2014
CN 104155803 A 11/2014
(Continued)

*Primary Examiner* — Jessica M Merlin
(74) *Attorney, Agent, or Firm* — Muncy, Geissler, Olds & Lowe, P.C.

(57) ABSTRACT

A backlight module and a liquid crystal display device are provided. The backlight module includes a heat dissipation plate having a groove in which a first buffer block is formed; a light guide plate is arranged between the heat dissipation plate and a middle frame; the light guide plate includes a light incidence side; a light source is arranged facing the light incidence side of the light guide plate. The middle frame is disposed over the light guide plate and the light source. A quantum strip is inserted into the groove, with one end portion of the quantum strip being attached to the first buffer block.

14 Claims, 2 Drawing Sheets

(52) U.S. Cl.
CPC .. *G02F 1/133385* (2013.01); *G02F 1/133608*
(2013.01); *G02B 6/0055* (2013.01); *G02F*
*2001/133317* (2013.01); *G02F 2001/133322*
(2013.01); *G02F 2201/503* (2013.01)

(58) Field of Classification Search
CPC ... G02F 1/133308; G02F 2001/133317; G02F
1/133512; G02F 1/133608; G02F
2201/503; G02F 1/133385
See application file for complete search history.

(56) References Cited

U.S. PATENT DOCUMENTS

| | | | |
|---|---|---|---|
| 2014/0240644 A1* | 8/2014 | Abe | G02B 6/0088 |
| | | | 349/71 |
| 2015/0219822 A1* | 8/2015 | Lee | G02B 6/0023 |
| | | | 362/608 |
| 2016/0054503 A1 | 2/2016 | Fan | |
| 2016/0223739 A1* | 8/2016 | Yoon | G02B 6/0088 |
| 2016/0341877 A1* | 11/2016 | Kim | G02B 6/0026 |

FOREIGN PATENT DOCUMENTS

| | | |
|---|---|---|
| CN | 104456311 A | 3/2015 |
| KR | 20110064741 A | 6/2011 |

\* cited by examiner

BACKLIGHT MODULE AND LIQUID CRYSTAL DISPLAY DEVICE

FIELD OF THE INVENTION

The present invention relates to display technology, and more particularly to a backlight module and a liquid crystal display device.

BACKGROUND OF THE INVENTION

With the continuous development of LCDs (liquid crystal displays), the user's quality requirements of the panel display is getting higher and higher.

In the conventional white backlight module, its luminescence principle is to utilize a blue light-emitting diode (LED) to excite yellow phosphors and its color gamut saturation value as defined by the National Television Standards Committee (NTSC) is about 60%~80%. In order to enhance the NTSC value, the blue light LED is currently used to excite the nanoscale quantum dots, which can make the NTSC value more than 100%, and the quality of the display panel can be achieved through the quantum effect.

Currently, the quantum dots are usually encased in a strip for protecting the quantum dots. However, the conventional strip of the quantum dots (QD) is fixed relatively firmly; due to the space of installation position of the QD strip being narrow, the conventional QD strip can be inconvenient to be replaced and easily damaged.

Thus, it is necessary to provide a backlight module and a liquid crystal display device to solve the problems of the prior art.

SUMMARY OF THE INVENTION

An object of the present invention is to provide a backlight module and a liquid crystal display device which can solve a technical problem of the conventional backlight module and liquid crystal display device in that it is convenient to be replaced and the quantum strip can be damaged easily.

In order to solve the aforementioned drawbacks of the prior art, the present invention provides a backlight module, comprising:

a heat dissipation plate having a groove in which a first buffer block is formed;

a light guide plate arranged between the heat dissipation plate and a middle frame, the light guide plate including a light incidence side;

a light source arranged facing the light incidence side of the light guide plate;

the middle frame disposed on the light guide plate and the light source;

a quantum strip inserted into the groove, one end portion of the quantum strip attached to the first buffer block;

a back frame, a second buffer block disposed on an inner surface of a side wall of the back frame, an interval between the second buffer block and the quantum strip being less than an interval between the light source and the quantum strip; and a reflective plate arranged between the heat dissipation plate and light guide plate.

In the backlight module of the present invention, an interval between the second buffer block and the middle frame is less than an interval between the light source and the middle frame.

In the backlight module of the present invention, an end portion of the second buffer block toward the middle frame is bonded to the middle frame.

In the backlight module of the present invention, a third buffer block is disposed between a first side of the light guide plate and a second side of the middle frame, an interval between the third buffer block and the quantum strip is less than an interval between the light guide plate and the quantum strip, the first side is one side of the light guide plate facing toward the middle frame and the second side is one side of the middle frame facing toward the light guide plate.

In the backlight module of the present invention, the first buffer block is bonded to a bottom of the groove.

In order to solve the aforementioned drawbacks of the prior art, the present invention provides a backlight module, comprising:

a light source arranged a heat dissipation plate having a groove in which a first buffer block is formed;

a light guide plate arranged between the heat dissipation plate and a middle frame, the light guide plate including a light incidence side;

a light source arranged facing the light incidence side of the light guide plate;

the middle frame being disposed over the light guide plate and the light source;

a quantum strip inserted into the groove, one end portion of the quantum strip being attached to the first buffer block.

In the backlight module of the present invention, the backlight module further comprises a back frame, a second buffer block disposed on an inner surface of a side wall of the back frame, an interval between the second buffer block and the quantum strip being less than an interval between the light source and the quantum strip.

In the backlight module of the present invention, an interval between the second buffer block and the middle frame is less than an interval between the light source and the middle frame.

In the backlight module of the present invention, an end portion of the second buffer block toward the middle frame is bonded to the middle frame.

In the backlight module of the present invention, a third buffer block is disposed between a first side of the light guide plate and a second side of the middle frame, an interval between the third buffer block and the quantum strip is less than an interval between the light guide plate and the quantum strip, the first side is one side of the light guide plate facing toward the middle frame and the second side is one side of the middle frame facing toward the light guide plate.

In the backlight module of the present invention, the backlight module further comprises a reflective plate arranged between the heat dissipation plate and light guide plate.

In the backlight module of the present invention, the first buffer block is bonded to a bottom of the groove.

The present invention further provides a liquid crystal display device, comprising: a liquid crystal display panel and a backlight module. The backlight module comprises:

a heat dissipation plate having a groove in which a first buffer block is formed;

a light guide plate arranged between the heat dissipation plate and a middle frame, the light guide plate including a light incidence side;

a light source arranged facing the light incidence side of the light guide plate;

the middle frame being disposed over the light guide plate and the light source; and a quantum strip inserted into the groove, one end portion of the quantum strip being attached to the first buffer block.

In the liquid crystal display device of the present invention, the backlight module further comprises a back frame, a second buffer block disposed on an inner surface of a side wall of the back frame, an interval between the second buffer block and the quantum strip being less than an interval between the light source and the quantum strip.

In the liquid crystal display device of the present invention, an interval between the second buffer block and the middle frame is less than an interval between the light source and the middle frame.

In the liquid crystal display device of the present invention, an end portion of the second buffer block toward the middle frame is bonded to the middle frame.

In the liquid crystal display device of the present invention, a third buffer block is disposed between a first side of the light guide plate and a second side of the middle frame, an interval between the third buffer block and the quantum strip is less than an interval between the light guide plate and the quantum strip, the first side is one side of the light guide plate facing toward the middle frame and the second side is one side of the middle frame facing toward the light guide plate.

In the liquid crystal display device of the present invention, the backlight module further comprises a reflective plate arranged between the heat dissipation plate and light guide plate.

In the liquid crystal display device of the present invention, the first buffer block is bonded to a bottom of the groove.

In the backlight module and the liquid crystal display device of the present invention, the quantum strip is inserted into the groove with the buffer block through arranging the groove on the conventional heat dissipation plate and disposing the buffer block in the bottom of the groove, thereby facilitating the replacement of the quantum strip and preventing damage of the quantum strip.

Figure 1:
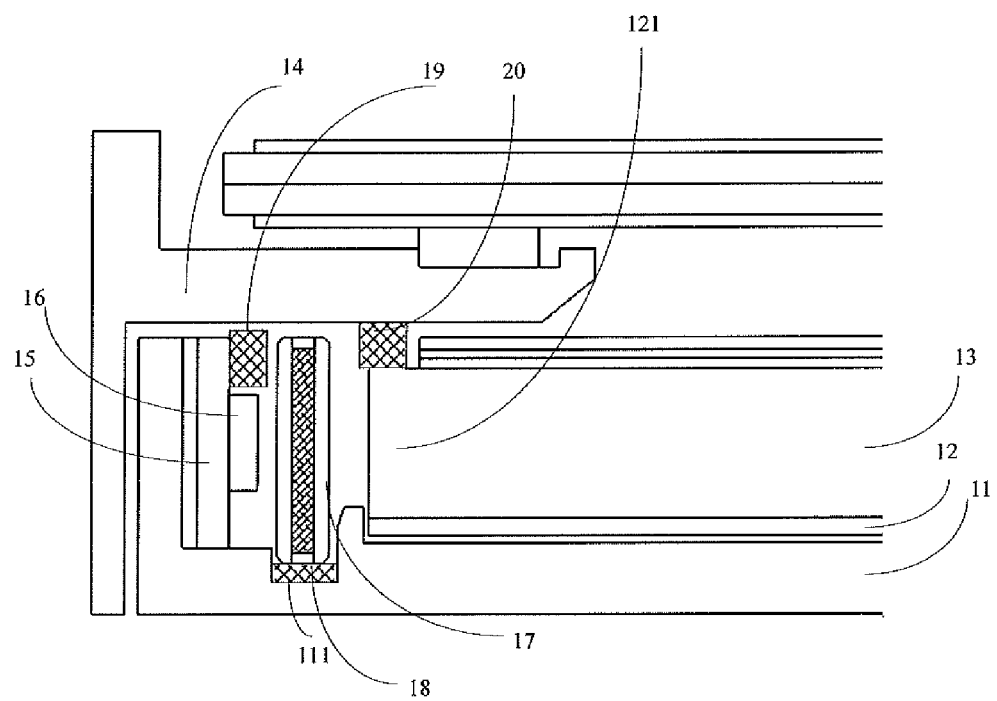
FIG. 1 is a structural schematic view of a backlight module of the present invention.

In the drawings: 11—heat dissipation plate, 12—reflective plate, 13—light guide plate, 14—middle frame, 15—back frame, 16—light source, 17—quantum strip, 18—first buffer block, 19—second buffer block, 20—third buffer block, 111—groove and 112—light incidence side.

DETAILED DESCRIPTION OF THE PREFERRED EMBODIMENTS

This description of the exemplary embodiments is intended to be read in connection with the accompanying drawings, which are to be considered part of the entire written description. In the description, terms such as "lower", "upper", "horizontal", "vertical", "above", "below", "up", "down", "top", and "bottom", as well as derivatives thereof should be construed to refer to the orientation as then described or as shown in the drawing under discussion. These terms are for convenience of description and do not require that the apparatus be constructed or operated in a particular orientation, and do not limit the scope of the invention. Referring to the drawings of the present invention, the same symbol represents the same component.

Refer to FIG. 1, the backlight module of the present invention includes a heat dissipation plate 11, a light guide plate 13, a middle frame 14, a light source 16, and a quantum strip 17. The light guide plate 13 is arranged between the heat dissipation plate 11 and the middle frame 14. The light guide plate 13 includes a light incidence side 121 and a light emitting side. Of course, a back plate can be arranged under the heat dissipation plate 11.

The light source 16 is arranged facing the light incidence side 121 of the light guide plate 13. The backlight module further comprises a back frame 15, and the light source 16 is fixed the on an inner surface of a side wall of the back frame 15. For example, the light source 16 is a blue LED light source. The middle frame 14 is disposed over the light guide plate 13 and the light source 16. Namely, the middle frame 14 is covered on the light guide plate 13 and the light source 16. The heat dissipation plate 11 includes a groove 111 in which a first buffer block 18 is formed. The quantum strip 17 is inserted into the groove 111, and one end portion of the quantum strip 17 is attached to the first buffer block 18. The first buffer block 18 can be bonded to the heat dissipation plate 11 defining a bottom of the groove 111.

Figure 2:
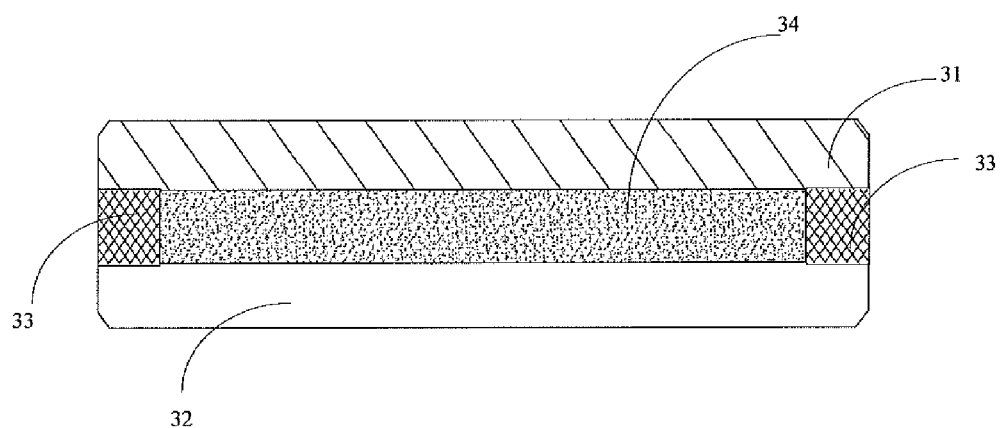
FIG. 2 is an amplified structural schematic view of a quantum strip of the present invention.

Refer to FIG. 2, the quantum strip 17 of the present invention comprises a first substrate 31 and a second substrate 32. The quantum dots material is filled between the first substrate 31 and the second substrate 32. Surrounding edges of the first substrate 31 and the second substrate 32 are bonded together by frame glue 33.

The buffer block is arranged at the bottom of the groove provided for inserting the quantum strip, thereby facilitating the replacement of the quantum strip and preventing the quantum strip from colliding with the bottom of the groove for avoiding damage of the quantum strip.

A second buffer block 19 is disposed on the inner surface of the side wall of the back frame 15. An interval between the second buffer block 19 and the quantum strip 17 is less than an interval between the light source 16 and the quantum strip 17. Namely, a thickness of the second buffer block 19 (i.e., the width in the horizontal direction in the drawing) is greater than a thickness of the light source 16. The thickness of the second buffer block 19 is greater than the thickness of the light source 16, thereby preventing the quantum strip from colliding with the light source while the quantum strip is tilted, so as to avoid damaging the light source.

Preferably, an interval between the second buffer block 19 and the middle frame 14 is less than an interval between the light source 16 and the middle frame 14. Namely, the second buffer block 19 is positioned above the light source 16, and the second buffer block 19 is closer to the middle frame 14. Due to a top portion of the quantum strip not being fixed, the second buffer block is arranged at the top portion of the quantum strip for better preventing the quantum strip from colliding with the light source while the quantum strip is tilted.

Preferably, the second buffer block is bonded to the inner surface of the sidewall of the back frame 15, so that the second buffer block can be replaced more conveniently.

To enhance the fixity of the second buffer block, an end of the second buffer block facing the middle frame can be preferably bonded to the middle frame. Namely, an upper end portion of the second buffer block 19 is bonded to a surface of the middle frame 14 toward the heat dissipation plate.

Preferably, a third buffer block 20 is disposed between a first side of the light guide plate 13 and a second side of the middle frame 14. The first side is one side of the light guide plate 13 facing toward the middle frame 14 and the second side is one side of the middle frame 14 facing toward the light guide plate 13. An interval between the third buffer block 20 and the quantum strip 17 is less than an interval between the light guide plate 13 and the quantum strip 17. Namely, the third buffer block 20 is disposed above the light guide plate 13 close to the quantum strip 17. The third buffer block is close to one side of the quantum strip and protrudes from the light incidence surface of the light guide plate, thereby preventing the quantum strip from colliding with the light guide plate while the quantum strip is tilted.

Preferably, the backlight module further comprises a reflective plate 12 arranged between the heat dissipation plate 11 and light guide plate 13. The material of the middle frame 14 may be plastic.

In the backlight module of the present invention, the groove is formed in the conventional heat dissipation plate. The buffer block is accommodated in the bottom of the groove. The quantum strip is inserted into the groove provided with the buffer block, thereby facilitating the replacement of the quantum strip and preventing damage of the quantum strip.

The present invention further provides a liquid crystal display device comprising a liquid crystal display panel and a backlight module, as shown in FIG. 1. The backlight module comprises: a heat dissipation plate 11, a light guide plate 13, a middle frame 14, a light source 16, and a quantum strip 17. The light guide plate 13 is arranged between the heat dissipation plate 11 and the middle frame 14. The light guide plate 13 includes a light incidence side 121 and a light emitting side. Of course, a back plate can be arranged under the heat dissipation plate 11.

The light source 16 is arranged facing the light incidence side 121 of the light guide plate 13. The backlight module further comprises a back frame 15, and the light source 16 is fixed the on an inner surface of a side wall of the back frame 15. For example, the light source 16 is a blue LED light source. The middle frame 14 is disposed over the light guide plate 13 and the light source 16. Namely, the middle frame 14 is covered on the light guide plate 13 and the light source 16. The heat dissipation plate 11 includes a groove 111 in which a first buffer block 18 is formed. The quantum strip 17 is inserted into the groove 111, and one end portion of the quantum strip 17 is attached to the first buffer block 18. The first buffer block 18 can be bonded to a bottom of the groove 111.

Refer to FIG. 2, the quantum strip 17 of the present invention comprises a first substrate 31 and a second substrate 32. The quantum dots material 34 is filled between the first substrate 31 and the second substrate 32. Surrounding edges of the first substrate 31 and the second substrate 32 are bonded together by the frame glue 33.

The buffer block is arranged at the bottom of the groove provided for insertion of the quantum strip thereinto, thereby facilitating the replacement of the quantum strip and preventing the quantum strip from colliding with the bottom of the groove for avoiding damage of the quantum strip.

A second buffer block 19 is disposed on the inner surface of the side wall of the back frame 15. An interval between the second buffer block 19 and the quantum strip 17 is less than an interval between the light source 16 and the quantum strip 17. Namely, a thickness of the second buffer block 19 (i.e., the width in the horizontal direction in the drawing) is greater than a thickness of the light source 16. The thickness of the second buffer block 19 is greater than the thickness of the light source 16, preventing the quantum strip from colliding with the light source while the quantum strip is tilted, so as to avoid damaging the light source.

Preferably, an interval between the second buffer block 19 and the middle frame 14 is less than an interval between the light source 16 and the middle frame 14. Namely, the second buffer block 19 is positioned above the light source 16, and the second buffer block 19 is closer to the middle frame 14. Due to a top portion of the quantum strip not being fixed, the second buffer block is arranged at the top portion of the quantum strip for better preventing the quantum strip from colliding with the light source while the quantum strip is tilted.

Preferably, the second buffer block is bonded to the inner surface of the sidewall of the back frame 15, so that the second buffer block can be replaced more conveniently.

To enhance the fixity of the second buffer block, an end portion of the second buffer block toward the middle frame can be preferably bonded to the middle frame. Namely, an upper end portion of the second buffer block 19 can be bonded to a surface of the middle frame 14 facing the heat dissipation plate.

Preferably, a third buffer block 20 is disposed between a first side of the light guide plate 13 and a second side of the middle frame 14. The first side is one side of the light guide plate 13 facing toward the middle frame 14 and the second side is one side of the middle frame 14 facing toward the light guide plate 13. An interval between the third buffer block 20 and the quantum strip 17 is less than an interval between the light guide plate 13 and the quantum strip 17. Namely, the third buffer block 20 is disposed above the light guide plate 13 close to the quantum strip 17. The third buffer block is close to one side of the quantum strip and protrude from the light incidence surface of the light guide plate, thereby preventing the quantum strip from colliding with the light guide plate while the quantum strip is tilted.

Preferably, the backlight module further comprises a reflective plate 12 arranged between the heat dissipation plate 11 and light guide plate 13. The material of the middle frame 14 may be plastic.

In the liquid crystal display device of the present invention, the groove is formed in the conventional heat dissipation plate. The buffer block is accommodated in the bottom of the groove. The quantum strip is inserted into the groove provided with the buffer block, thereby facilitating the replacement of the quantum strip and preventing damage of the quantum strip.

The present invention has been described with preferred embodiments thereof, and it is understood that many changes and modifications to the described embodiment can be carried out without departing from the scope and the spirit of the invention that is intended to be limited only by the appended claims.

What is claimed is:
1. A backlight module, comprising:
a heat dissipation plate having a groove, wherein a first buffer block is totally accommodated in the groove;
a light guide plate arranged between the heat dissipation plate and a middle frame, the light guide plate including a light incidence side;
a light source arranged facing the light incidence side of the light guide plate;
the middle frame being disposed over the light guide plate and the light source;

a quantum strip inserted into the groove, one end portion of the quantum strip being attached to the first buffer block;

a back frame, a second buffer block disposed on an inner surface of a side wall of the back frame, an interval between the second buffer block and the quantum strip being less than an interval between the light source and the quantum strip; and a reflective plate arranged between the heat dissipation plate and the light guide plate;

wherein a third buffer block is disposed between a first side of the light guide plate and a second side of the middle frame, and the third buffer block is disposed above the light guide plate close to the quantum strip, an interval between the third buffer block and the quantum strip is less than an interval between the light guide plate and the quantum strip, the first side is one side of the light guide plate facing toward the middle frame and the second side is one side of the middle frame facing toward the light guide plate.

2. The backlight module according to claim 1, wherein an interval between the second buffer block and the middle frame is less than an interval between the light source and the middle frame.

3. The backlight module according to claim 1, wherein an end portion of the second buffer block toward the middle frame is bonded to the middle frame.

4. The backlight module according to claim 1, wherein the first buffer block is bonded to a bottom of the groove.

5. A backlight module, comprising:

a heat dissipation plate having a groove, wherein a first buffer block is totally accommodated in the groove;

a light guide plate arranged between the heat dissipation plate and a middle frame, the light guide plate including a light incidence side;

a light source arranged facing the light incidence side of the light guide plate;

the middle frame being disposed over the light guide plate and the light source; and a quantum strip inserted into the groove, one end portion of the quantum strip being attached to the first buffer block;

wherein a third buffer block is disposed between a first side of the light guide plate and a second side of the middle frame, and the third buffer block is disposed above the light guide plate close to the quantum strip, an interval between the third buffer block and the quantum strip is less than an interval between the light guide plate and the quantum strip, the first side is one side of the light guide plate facing toward the middle frame and the second side is one side of the middle frame facing toward the light guide plate.

6. The backlight module according to claim 5, wherein the backlight module further comprises a back frame, a second buffer block disposed on an inner surface of a side wall of the back frame, an interval between the second buffer block and the quantum strip being less than an interval between the light source and the quantum strip.

7. The backlight module according to claim 6, wherein an interval between the second buffer block and the middle frame is less than an interval between the light source and the middle frame.

8. The backlight module according to claim 6, wherein an end portion of the second buffer block toward the middle frame is bonded to the middle frame.

9. The backlight module according to claim 5, wherein the backlight module further comprises a reflective plate arranged between the heat dissipation plate and light guide plate.

10. A liquid crystal display device, comprising:

a liquid crystal display panel; and a backlight module, which comprises:

a heat dissipation plate having a groove, wherein a first buffer block is totally accommodated in the groove;

a light guide plate arranged between the heat dissipation plate and a middle frame, the light guide plate including a light incidence side;

a light source arranged facing the light incidence side of the light guide plate;

the middle frame disposed over the light guide plate and the light source; and a quantum strip inserted into the groove, one end portion of the quantum strip attached to the first buffer block;

wherein a third buffer block is disposed between a first side of the light guide plate and a second side of the middle frame, and the third buffer block is disposed above the light guide plate close to the quantum strip, an interval between the third buffer block and the quantum strip is less than an interval between the light guide plate and the quantum strip, the first side is one side of the light guide plate facing toward the middle frame and the second side is one side of the middle frame facing toward the light guide plate.

11. The liquid crystal display device according to claim 10, wherein the backlight module further comprises a back frame, a second buffer block disposed on an inner surface of a side wall of the back frame, an interval between the second buffer block and the quantum strip being less than an interval between the light source and the quantum strip.

12. The liquid crystal display device according to claim 11, wherein an interval between the second buffer block and the middle frame is less than an interval between the light source and the middle frame.

13. The liquid crystal display device according to claim 11, wherein an end portion of the second buffer block toward the middle frame is bonded to the middle frame.

14. The liquid crystal display device according to claim 10, wherein the backlight module further comprises a reflective plate arranged between the heat dissipation plate and light guide plate.

* * * * *